J. A. GORDON.
AIR FILTER.
APPLICATION FILED MAR. 5, 1921.
1,398,685. Patented Nov. 29, 1921.
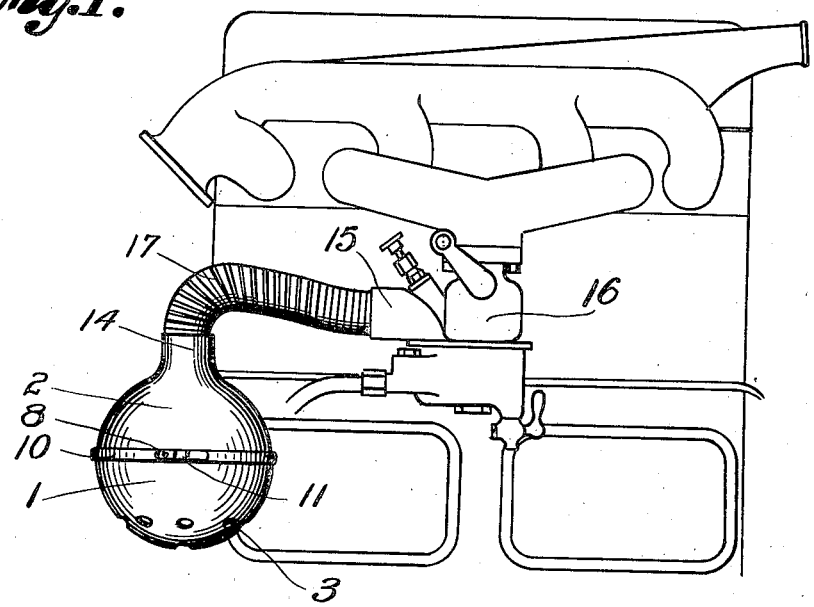
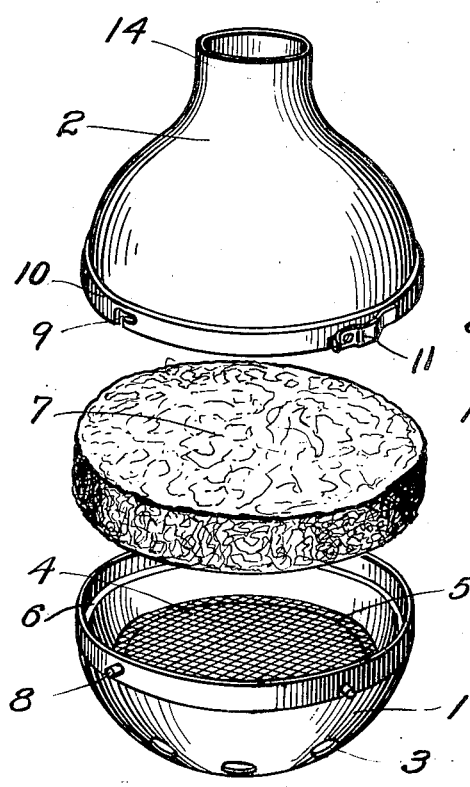
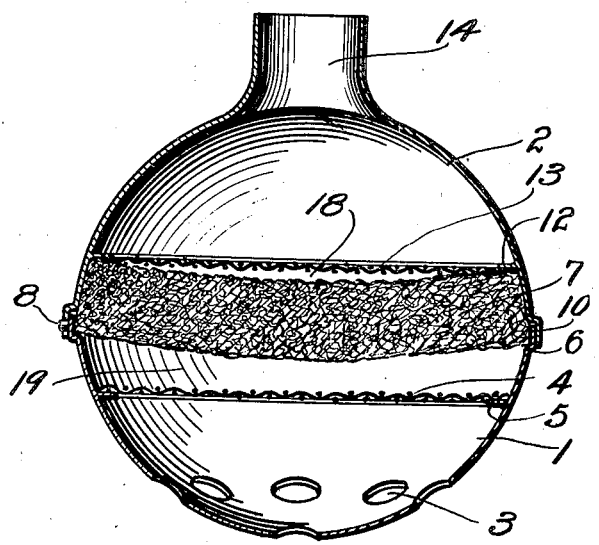
INVENTOR
John A. Gordon.
BY
ATTORNEY

UNITED STATES PATENT OFFICE.

JOHN A. GORDON, OF KANSAS CITY, MISSOURI, ASSIGNOR OF ONE-HALF TO CHARLES E. HOSE, OF KANSAS CITY, MISSOURI.

AIR-FILTER.

1,398,685.   Specification of Letters Patent.   Patented Nov. 29, 1921.

Application filed March 5, 1921. Serial No. 449,790.

*To all whom it may concern:*

Be it known that I, JOHN A. GORDON, a citizen of the United States, residing at Kansas City, in the county of Jackson and State of Missouri, have invented certain new and useful Improvements in Air-Filters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
This invention relates to air filters for filtering air to be introduced into the engine as part of the explosive mixture for the combustion chamber and is a continuation in part of an application filed by me on or about December 13, 1920, and given Serial No. 430,333.

The invention contemplates an air filter in which the filter bed consists of a flexible, vibratory disk having sufficient porosity to admit air therethrough and having inherent resiliency to enable the disk to partake of a vibratory motion whereby extraneous matter filtered from the air as it passes through the filter bed will be automatically excluded by the working of the walls of the interstices one upon the other.

Air has hitherto been filtered by passing it through hair, felt, matted fiber and the like but the objections to such filtering means is that the interstices or pores soon become clogged, thereby choking the filter so that a free passage of air will be obstructed.

I have found that a porous filter bed which has a vibratory motion during the filtering operation will admit the requisite quantity of air to pass thereto and will, to a large extent, free itself of impurities, such as dust, dirt and other extraneous matter.

In actual practice I have found that the commercial product commonly known as "sponge rubber" admirably lends itself to the requirements because the sponge rubber has sufficient resiliency to provide the necessary tensile strength to resist disruption by vibration and from the very nature of the pores or cells in the rubber, working of the porous walls during the vibration will tend to eliminate or eject any accumulations which would otherwise adhere to a static filter bed.

I have shown the invention applied to a convenient form of casing and attached to the inlet end of a carbureter of conventional form, it being understood, however, that the device is not limited to attachment to any particular type of carbureter or for any particular purpose for, while it is primarily intended for tractors, trucks and the like, it is also applicable for other uses in which a hydrocarbon explosion engine constitutes a part.

In the drawings,

Figure 1 is a side elevational view of a gas engine to which my invention is applied.

Fig. 2. is a vertical, cross sectional view through the filter constructed in accordance with my invention, and Fig. 3 is a disassociated view of the three main portions of the filter.

In carrying out my invention I may provide a filter bed case consisting of the complementary members 1 and 2. These are shown as semi-spherical. The member 1 is shown as consisting of a semi-spherical body having inlet openings 3 near its lower end, and interposed between the flat side and the curved bottom is a screen 4 of suitable mesh supported upon an inwardly extending flange 5, which constitutes a guard, as will be explained hereinafter.

The open side of the semi-spherical member 1 is provided with a shoulder or offset portion 6, against which one face of a filter 7 may rest, the filter being normally held within the member 2 as will be explained hereinafter.

The member 1 is provided with outstanding, radial pins or projections 8, which are adapted to be engaged by bayonet slots 9 in the offset, flanged portion 10 of the member 2, there being a spring latch 11 carried by the flanged portion 10 to engage one of the pins so as to constitute a lock to secure the members 1 and 2 together.

The upper member 2 is provided with a ring or flange 12, which is secured to the inner face thereof and it, in turn, constitutes a frame for a reticulated screen or mesh 13, the screens 4 and 13 constituting a cage between which the filter bed 7 is confined. The filter bed or disk 7 normally rests against the seat or flange 12 and against the offset portion 6 when the device is assembled, there being an outlet opening or neck 14 carried by the member 2 so that the filter may be connected to the inlet 15 of the carbureter 16 by a flexible hose or similar connection 17.

The diameter of the filter bed or disk 7 is normally slightly in excess of the inner diameter of the casing consisting of the members 1 and 2 so that when the filter bed is in place, as shown in Fig. 2, it will be slightly dished or bulged to provide a concavo-convex filter bed having a space 18 between its center and the reticulated wall 13 of the filter bed cage 19.

Since the filter bed 7 is preferably constructed of sponge rubber and its diameter is such that a bulge or dished formation will result from the introduction into the casing consisting of the members 1 and 2, it is obvious that air drawn in through the openings 3 will, during its passage through the filter bed 7, cause the filter bed to vibrate at the central portion against the reticulated screen 13, that is, on the intake stroke of the engine. On the closing of the inlet valve, the inherent resiliency of the bed 7 will spring it back into the position shown in Fig. 2 so that there will be a constant vibration back and forth during the time that the device is in use; that is, there will be an alternating vibration, causing the walls of the interstices of the sponge rubber filter bed to work one against the other and thereby force out and, to a large extent, prevent the accumulation of dust, dirt and other extraneous matter.

The device is shown as having a case consisting of a spherical body although it is obvious that the shape may be varied if desired.

The inner ring 5 for the member 1 constitutes a deflector for the incoming dust and moisture laden air so that it will be deflected toward the center of the filter bed, eliminating leakage about the periphery of the bed 7. The flange 12 also acts as a guard as well as a seat to prevent the passage of dust-ladened air between the perimeter of the bed 7 and the inner face of the casing.

It will be seen from the foregoing that the filter not only is constructed so that it will efficiently remove extraneous matter from the air passing through it but will also have a mechanical dust-freeing action to squeeze out the accumulations which might adhere to the walls of the interstices present in the body portion thereof.

What I claim and desire to secure by Letters-Patent is:

1. A filter comprising a casing having an inlet, an outlet and a circumferential seat, and a filter bed of resilient material interposed between the inlet and the outlet and confined within the circumferential seat, the diameter of the bed being normally greater than the diameter of the seat whereby when the bed is forced into place, it will be slightly dished with the convex side toward the inlet so as to cause it to vibrate under the action of the air passing through it during the filtering operation.

2. A filter comprising a casing having an inlet, an outlet and a seat extending around the perimeter of the casing, and a filter bed of yielding material having intercommunicating cells and interposed between the inlet and outlet, the filter bed being confined within the circumferential seat, the diameter of the bed being normally greater than the diameter of the seat whereby when the bed is forced into place, it will be slightly dished with the convex side toward the inlet so as to cause it to vibrate under the action of air passing through it during the filtering operation.

In testimony whereof I affix my signature.

JOHN A. GORDON.